(12) United States Patent
Willems et al.

(10) Patent No.: US 11,306,870 B2
(45) Date of Patent: Apr. 19, 2022

(54) SYSTEM AND METHOD FOR EXECUTING A LUBRICATION PLAN

(71) Applicant: Aktiebolaget SKF, Gothenburg (SE)

(72) Inventors: Guus Willems, Utrecht (NL); Julien Meunier, Utrecht (NL)

(73) Assignee: AKTIEBOLAGET SKF, Gothenburg (SE)

(*) Notice: Subject to any disclaimer, the term of this patent is extended or adjusted under 35 U.S.C. 154(b) by 292 days.

(21) Appl. No.: 16/529,977

(22) Filed: Aug. 2, 2019

(65) Prior Publication Data

US 2019/0368657 A1    Dec. 5, 2019

Related U.S. Application Data

(62) Division of application No. 15/303,671, filed as application No. PCT/EP2015/058097 on Apr. 14, 2015, now Pat. No. 10,422,475.

(30) Foreign Application Priority Data

Apr. 14, 2014 (GB) .................................... 1406637

(51) Int. Cl.
    *F16N 29/02*     (2006.01)
    *G01F 15/06*     (2022.01)
    *F16N 11/00*     (2006.01)
    *G01F 11/00*     (2006.01)
    *F16N 5/00*     (2006.01)
    *G01F 15/063*     (2022.01)

(52) U.S. Cl.
CPC .............. *F16N 29/02* (2013.01); *F16N 11/00* (2013.01); *G01F 11/00* (2013.01); *G01F 15/063* (2013.01); *G01F 15/068* (2013.01); *F16N 5/00* (2013.01); *F16N 2250/40* (2013.01)

(58) Field of Classification Search
CPC .............. F16N 3/12; F16N 29/02; F16N 29/00
USPC ........................................... 184/6.4
See application file for complete search history.

(56) References Cited

U.S. PATENT DOCUMENTS 5,310,020 A * 5/1994 Martin ..................... F01M 5/02
    184/104.1
5,482,138 A * 1/1996 Mori ......................... E02F 9/00
    184/6
5,535,849 A * 7/1996 Few ..................... F01M 11/0458
    141/94

(Continued)

*Primary Examiner* — Henry Y Liu
(74) *Attorney, Agent, or Firm* — J-Tek Law PLLC; Scott T. Wakeman; Mark A. Ussai

(57) ABSTRACT

A system for executing a lubrication plan including a grease meter for measuring a volumetric flow of grease through the meter. The grease meter having a memory for storing a set of instructions that includes a series of prescribed grease volumes be delivered at a corresponding series of lubrication points, a memory for storing a volume of grease delivered at a particular lubrication point and is configured to communicate with the display device. A display device includes a memory for storing an image of each lubrication point in the series, each image being a photograph of the machine that has the lubrication point. The machine is configured to display each image along with the prescribed grease volume to be delivered at the corresponding lubrication point. The displayed image of a further lubrication point in the series image is triggered by the grease meter when a delivered volume is stored.

8 Claims, 3 Drawing Sheets

(56) References Cited

U.S. PATENT DOCUMENTS

| | | | | |
|---|---|---|---|---|
| 8,408,362 | B2* | 4/2013 | Eadie | B61K 3/02 |
| | | | | 184/3.1 |
| 8,746,068 | B2* | 6/2014 | Goodman | G01M 13/045 |
| | | | | 73/593 |
| 9,022,177 | B2* | 5/2015 | Conley | F16N 7/14 |
| | | | | 184/6.4 |
| 2007/0137942 | A1* | 6/2007 | Weems | F16N 5/02 |
| | | | | 184/105.2 |
| 2007/0272486 | A1* | 11/2007 | Eadie | B61K 3/02 |
| | | | | 184/3.1 |
| 2008/0017452 | A1* | 1/2008 | Chen | F16N 29/00 |
| | | | | 184/105.2 |
| 2011/0174083 | A1* | 7/2011 | Berger | G01F 15/18 |
| | | | | 73/861.27 |
| 2011/0253480 | A1* | 10/2011 | Goodman | G01M 3/24 |
| | | | | 184/36 |
| 2013/0081903 | A1* | 4/2013 | Alekseyev | F16N 3/12 |
| | | | | 184/26 |
| 2018/0021670 | A1* | 1/2018 | Price, Jr. | A63F 13/428 |
| | | | | 463/36 |

* cited by examiner

SYSTEM AND METHOD FOR EXECUTING A LUBRICATION PLAN

CROSS REFERENCE

This Application is a Divisional of U.S. patent application Ser. No. 15/303,671, filed on Oct. 12, 2016, which is a United States National Stage Application claiming the benefit of International Application Number PCT/EP2015/058097, filed on Apr. 14, 2015, which claims the benefit of British Patent Application 1406637.7 filed on Apr. 14, 2014 all of which are incorporated herein by reference in their entireties.

FIELD OF THE INVENTION

The present invention relates to a system and method for lubricating a plurality of machines with grease, whereby each machine has one or more lubrication points.

BACKGROUND TO THE INVENTION

Re-lubrication is an essential part of machine maintenance, particularly when the machine comprises rolling element bearings. Commonly, the bearings are mounted in a housing that is equipped with a lubrication point for supplying the bearing with grease. When the lubrication points on a machine are located in a hard-to-reach place, automatic lubricators are often connected to the lubrication points. If, however, the lubrication points are accessible, it is common practice for these lubrication points to be lubricated manually.

A maintenance technician may print out a task list of machines and associated lubrication points where a prescribed quantity of grease is to be delivered, when the prescribed re-lubrication interval has elapsed. A grease gun is typically used, possibly in combination with a grease flow meter, to ensure that the correct quantity of grease is delivered. When each lubrication task on the list has been completed, the technician will then enter the associated data in, for example, a lubrication scheduling program.

A problem associated with manual lubrication is that lubrication points are not always clearly indicated on a machine, making it possible to lubricate the wrong place. Also, the entry of data after all of the lubrication tasks have been performed incurs the risk of errors. A machine which had not, in fact, been relubricated might get marked as such in the program, meaning that the next scheduled lubrication action will occur too late.

A possible solution to this problem is proposed in U.S. Pat. No. 6,997,286, which discloses a method and a device for the manual lubrication of a plurality of lubrication points with a quantity of lubricant, individually predetermined for each lubrication point. The lubrication points are provided with individual identification elements. Information on the quantity of lubricant to be administered to each lubrication point in each instance of lubrication is stored in a memory. During lubrication, the lubrication point is identified and information on the predetermined quantity of lubricant is retrieved from the memory, following which lubricant is administered to the lubrication point. Information on the lubrication carried out and the time thereof is stored in the memory. The device includes a lubricant gun, with means for measuring the quantity administered and for identifying the lubrication point.

Although this solution eliminates many of the possibilities for human error, the cost and effort involved in providing each lubrication point with an electronic identification tag is considerable.

Consequently, there is room for improvement in terms of defining a method and a system for executing a manual re-lubrication plan, which are more straightforward and inexpensive.

SUMMARY OF THE INVENTION

In a first aspect, the present invention defines a method of executing a lubrication plan for lubricating a plurality of machines with grease, where each machine comprises one or more lubrication points where grease can be delivered. The method comprises steps of:

defining a set of instructions for the lubrication plan, including at least a series of prescribed grease volumes $V_1$, $V_2$, ... $V_n$ to be delivered at a corresponding series of lubrication points $L_1$, $L_2$, ... $L_n$;

generating an image of each lubrication point in the series, whereby each generated image comprises a photograph of the machine that has the lubrication point, including a visual indication of the location of that lubrication point on the machine;

storing the set of instructions and each generated image in a system comprising a grease meter and a display device;

displaying a generated image of a lubrication point in the series on the display device, including the prescribed grease volume be delivered there;

delivering grease at that lubrication point via the grease meter, which measures and stores the delivered volume;

displaying a generated image of a further lubrication point in the series, including the prescribed grease volume be delivered there, whereby the step of displaying (vi) is triggered by the storage of the delivered volume measured by the grease meter in step (v); and repeating steps (v) and (vi) until the grease meter has stored the delivered volume of grease for all of the lubrication points in the series.

Thus, a maintenance technician who is carrying out the lubrication plan sees a real image of each lubrication point, including an indication of where it is located on the particular machine. In one example, the location is indicated by an arrow that is superimposed on the photograph of the machine. It another example, the location is highlighted. Many other options exist.

The images are displayed on a screen of the display device. In some examples, the display device is integrated in the grease meter, which has the advantage of reducing the number of system components. In other examples, the grease meter is configured to communicate with an external device such as a smart phone or a tablet computer or a pair of ®Google glasses.

In addition to being directed to the correct point on a machine, the technician also sees the prescribed volume of grease to be delivered at that point. Preferably, the set of instructions also includes a prescribed type of grease to be delivered at each lubrication point in the series, which is displayed on the screen of the display device along with the prescribed volume. Furthermore, a code may be assigned to each lubrication point in series, which is then also displayed.

Therefore, by means of the displayed information and the use of a grease meter, the technician is able to provide the right amount of grease at the right place. The grease meter is configured to store the volume of grease that has been delivered during a lubrication event, which reduces the possibility for human error. The act of storing also triggers the display of the next lubrication point in the series.

In one embodiment of the method of the invention, a sequential order is assigned to each lubrication point in the series. Thus, a certain lubrication point is defined as the first point $L_1$ in the series and this first point is displayed in the first step of displaying (iv). After storage of the volume of grease delivered there, the next lubrication point in the sequential order, i.e. $L_2$, is displayed in the further step of displaying (vi). The next lubrication point to be displayed will be $L_3$ and so on.

In a further embodiment of the method, a geographic position is assigned to each lubrication point in the series and the grease meter or the display device is equipped with a positioning system. In this embodiment, the first lubrication point to be displayed is the lubrication point that is geographically closest to the technician (and positioning system). The next lubrication point to be displayed will again be the point in the series that is geographically closest, for which a delivered volume of grease has not yet been stored.

In a further development, the steps of displaying (iv) and (vi) further comprise displaying an indication of where the lubrication point is located, relative to the location of the technician, to guide the technician to the right location.

Furthermore, the system may be configured to store the geographic position at which a certain grease volume has been delivered. This enables verification that the right amount of grease has been delivered at the right place.

Advantageously, the grease meter is further configured to time stamp the time at which the delivered volume of grease was stored. This enables accurate scheduling of when the next lubrication event should be performed at the corresponding lubrication point.

In some examples, the grease meter is integrated in a grease gun that delivers the grease. The grease meter may then be further configured to stop the delivery of grease when the prescribed volume has been measured.

In a second aspect of the invention, a system for executing a lubrication plan is defined. The system comprises a display device and a grease meter for measuring a volumetric flow of grease through the meter, whereby the grease meter comprises:

memory means for storing a set of instructions, which at least include a series of prescribed grease volumes $V_1$, $V_2$, ... $V_n$ to be delivered at a corresponding series of lubrication points $L_1$, $L_2$, ... $L_n$;

memory means for storing a volume of grease delivered at a particular lubrication point; and means for communicating with the display device.

The display device comprises memory means for storing an image of each lubrication point in the series, each image being a photograph of the machine that comprises the lubrication point, including a visual indication of the location of that lubrication point on the machine. Furthermore, the display device is configured to display each image along with the prescribed grease volume that is to be delivered at the corresponding lubrication point. After displaying one image, the display of a further image is triggered by the grease meter when a delivered volume is stored.

Advantageously, the memory and communication means of the grease meter are housed within an electronic module that is separated from the mechanical parts of the grease meter, to protect the electronics from contamination. In a further development, the electronic module is a detachable module that can be repeatedly detached from and reconnected to the grease meter. Thus, if the technician wants to upload the stored data into a computer located in e.g. an office environment, the "dirty" parts of the grease meter can be left behind.

In a still further development, the grease meter is equipped with means for measuring and storing a signal from a sensor, such as a vibration sensor that is mounted on one or more of the machines to be relubricated. This makes it possible to carry out condition monitoring during a lubrication event.

Thus, the system and method of the invention enable a technician to execute a lubrication plan in an efficient and straightforward manner. Other advantages will become apparent from the detailed description and accompanying drawings.

DETAILED DESCRIPTION OF THE INVENTION

Figure 1:
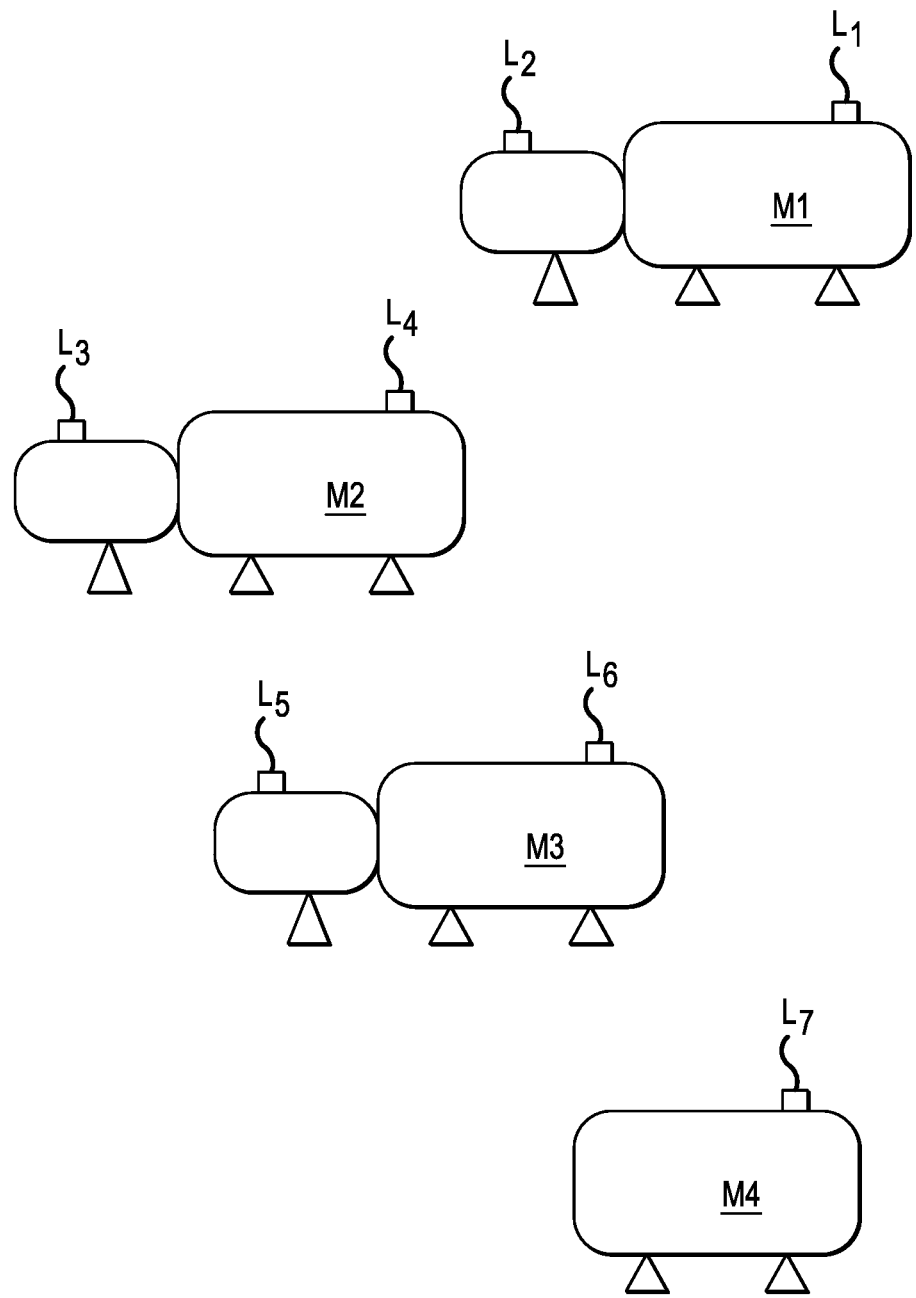
FIG. 1 shows a schematic view of a plurality of machines and a series of lubrication points provided on the plurality of machines.

FIG. 1 is a schematic representation of four machines M1, M2, M3, M4, each of which has at least one lubrication point, defining a series of lubrication points $L_1$, $L_2$, $L_3$, $L_4$, $L_5$, $L_6$, $L_7$. Let us assume that all four machines are due for re-lubrication, whereby a prescribed volume of grease is to be delivered at each of the lubrication points. Thus, a series of prescribed grease volumes $V_1$, $V_2$, $V_3$, $V_4$, $V_5$, $V_6$, $V_7$ associated with the corresponding series of lubrication points $L_1$, $L_2$, $L_3$, $L_4$, $L_5$, $L_6$, $L_7$ can be defined.

The series of grease volumes to be delivered at the corresponding lubrication points forms a set of instructions or lubrication tasks which are to be executed manually by a technician. To facilitate the accurate and efficient execution of the lubrication tasks, the technician employs a system comprising a grease meter and a display device and follows an inventive method.

In a first step of the method, the set of instructions associated with the lubrication tasks are defined. The set of instructions at least includes a definition of the lubrication points to be lubricated and the volume of grease to be delivered there.

Figure 2:
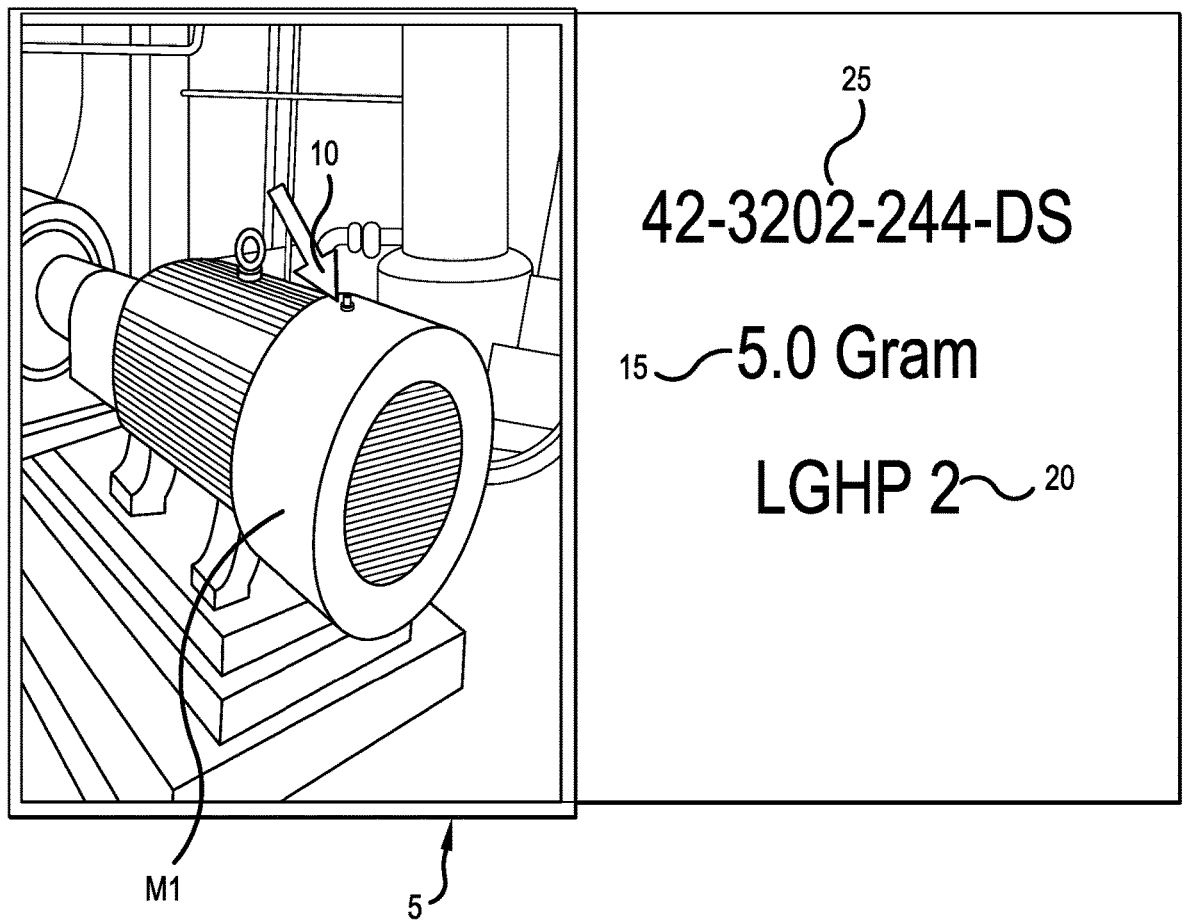
FIG. 2 shows an example of a generated image that may be displayed in the method of the invention.

In a second step, an image of each lubrication point in the series is generated. The generated image comprises a digital photograph of the machine that has the lubrication point, plus an additional visual indication of the location of the lubrication point on the machine. An example of a generated image, of lubrication point $L_1$, is shown in FIG. 2. The generated image 5 consists of a photograph of machine M1 and a superimposed arrow 10 that points to the location of the lubrication point $L_1$.

Suitably, such an image is generated for each lubrication point in the plant or factory, whereby a unique identifier is assigned to each lubrication point. The unique identifier may be a code, such as "42-3202-244-DS" (indicated by reference numeral 20 in FIG. 2). In other words, a visual library of the lubrication points is created.

According to a third step in the method of the invention, the visual library of lubrication points and the set of instructions associated with the lubrication tasks are stored in a system comprising a grease meter and a display device.

In one embodiment of the method, the series of lubrication points at which grease is to be delivered is defined in sequential order. With reference to FIG. 1, lubrication point $L_1$ is the first point in the sequence, $L_2$ is the second point in the sequence and so on. After the set of instructions has been stored, a fourth step in the method comprises displaying the generated image 5 of the first lubrication point $L_1$ on a screen of the display device. In addition to the generated image, the prescribed volume of grease $V_1$ to be delivered at the first lubrication point is displayed, e.g. 5 g. Preferably, a prescribed type of grease to be delivered is also displayed, e.g. LGHP2 (indicated by reference numeral 15). The identification code 20 associated with the first lubrication point may also be displayed.

The photographic image of the machine M1 enables the technician to easily find the correct machine; the arrow 10 quickly directs him to the lubrication point $L_1$ and the displayed volume $V_1$ tells him how much to deliver. In a fifth step of the method, the technician delivers the prescribed volume of grease using a grease meter connected to e.g. a grease gun. The grease meter measures the volume of grease delivered and stores the delivered volume.

The storage of the delivered grease volume may be initiated by the technician, e.g. by pressing a button on the grease meter or on the display device. Alternatively, the grease meter may be configured to store the delivered volume after a prescribed interval of no grease flow measurement. For example, 30 seconds after grease delivery has stopped.

Storage of the volume of grease delivered at the first lubrication $L_1$ point triggers a sixth step of the method, in which a generated image of the next lubrication point $L_2$ in the sequence is displayed. Again, the generated image comprises a photograph of machine M1 plus an arrow that points to the location of the second lubrication point $L_2$. Furthermore, the prescribed volume of grease $V_2$ to be delivered there is displayed, preferably along with the prescribed type of grease and the identification code associated with the second lubrication point. After the technician has performed the lubrication task at $L_2$, the delivered volume is stored in the grease meter, which triggers the display of the third lubrication point $L_3$ in the sequence.

Thus, the fifth and sixth steps of the method are repeated until the final volume $V_7$ for the final lubrication point $L_7$ in the sequence has been stored. When all of the tasks have been performed, the delivered volumes $V_1$-$V_7$ associated with the corresponding lubrication points $L_1$-$L_7$ are suitably loaded into a central computer or, for example, a software package for managing and scheduling lubrication tasks. Alternatively, the completed task list may be uploaded to a cloud platform.

Figure 3:
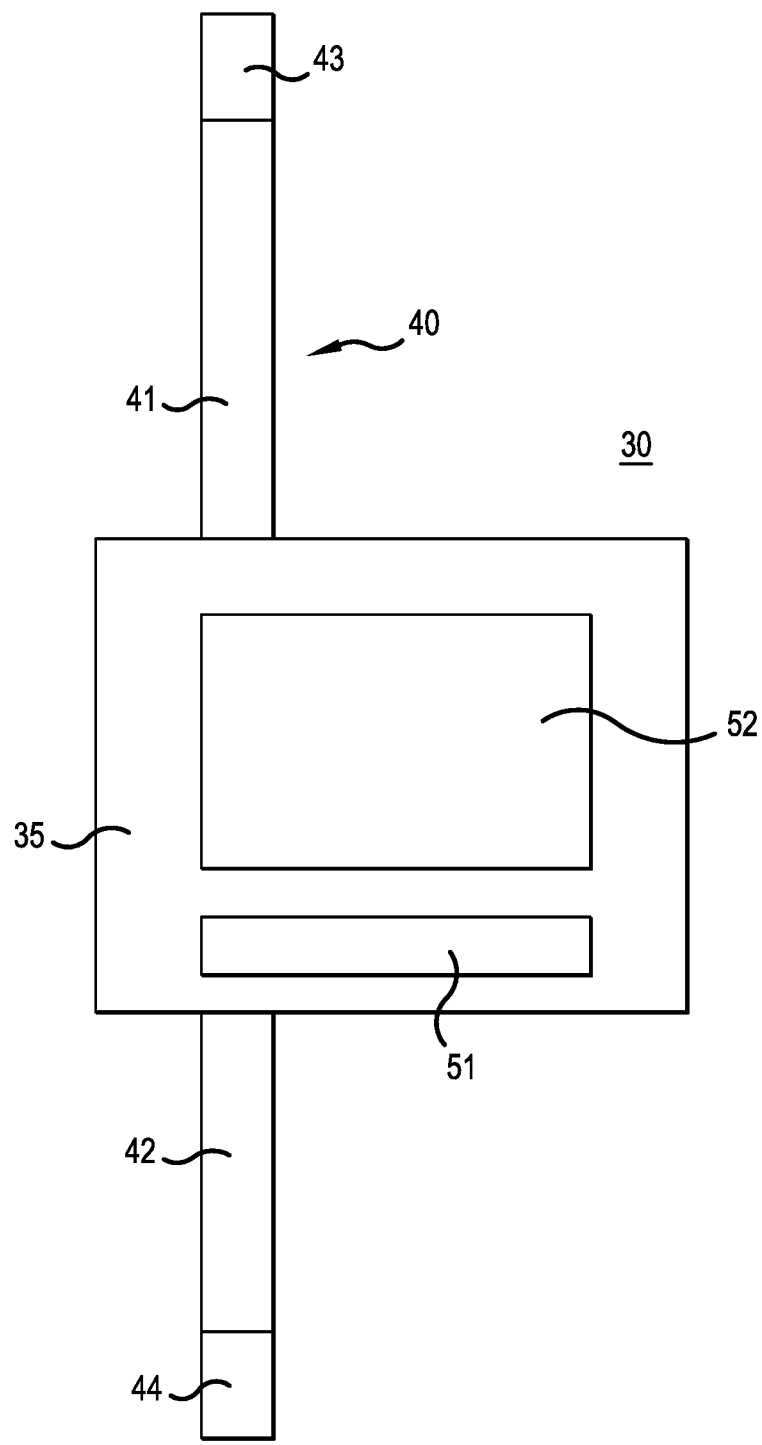
FIG. 3 shows an example of a device configured for use in the method of the invention

The display device used in the system and methods of the invention can be a tablet computer, or a smart phone or a pair of ®Google glasses. In one embodiment, the display device is integrated in the grease meter. A front view of such a grease meter is shown in FIG. 3.

The grease meter 30 in the depicted example is an oval gear meter such as described in WO2007/132062. The grease meter comprises two oval-shaped gears arranged to rotate in synchronism in a chamber provided in a housing 35. When grease flows through the chamber, the gears rotate at a speed proportional to the flow rate. The meter is further equipped with means for detecting the rotational speed of the gears, enabling the volume of grease passing though the chamber in a given time interval to be measured.

The grease meter further comprises a delivery tube 40 having first and second sections 41, 42 in connection with the chamber. The first section has a connection point 43 to which a grease gun is connectable; the second section 42 has a connection point 44 that is configured for connection to a machine lubrication point.

In the depicted example, the grease meter has a first screen 51 for displaying the volume of grease being measured. A second screen 52 is provided for displaying the generated image of a lubrication point, plus at least the prescribed grease volume, as described above. Needless to say, a single screen may be provided for displaying all information.

In a further embodiment, the grease meter or the display device (when separate) is equipped with a positioning system and a geographic position is assigned to each lubrication point $L_1$, $L_2$, $L_3$, $L_4$, $L_5$, $L_6$, $L_7$.

In a corresponding embodiment of the method, the first generated image to be displayed on the screen of the display device is a generated image of the lubrication point that is geographically closest to the positioning system. Let us assume that this is the lubrication point indicated in FIG. 1 with reference $L_3$. After the volume of grease delivered at $L_3$ has been stored, the next generated image displayed is a generated image of the lubrication point closest to $L_3$, i.e. $L_4$ The next generated image displayed will be an image of the closest lubrication point to $L_4$ for which a delivered volume of grease has not yet been stored. Advantageously, the grease meter is further configured to store the geographic position at which a delivered volume of grease is stored. This enables further verification that grease has been delivered at the correct lubrication point.

A number of aspects/embodiments of the invention have been described. The invention is not restricted to the described embodiments, but may be varied within the scope of the accompanying patent claims.

The invention claimed is:

1. A system for executing a lubrication plan, the system comprising:
    a grease meter for measuring a volumetric flow of grease through the meter, and
    a display device,
    wherein the grease meter includes:
    memory means for storing a set of instructions, which at least include a series of prescribed grease volumes V1, V2, . . . Vn to be delivered at a corresponding series of lubrication points L1, L2, . . . Ln,
    memory means for storing a volume of grease delivered at a particular lubrication point; and
    means for communicating with the display device; and
    wherein the display device includes memory means for storing an image of each lubrication point in the series, each image being a photograph of the machine that comprises the lubrication point, including a visual indication of the location of that lubrication point on the machine, and
    wherein the display device is configured to display each image along with the prescribed grease volume that is to be delivered at the corresponding lubrication point, whereby the display of the image of a further lubrication point in the series image is triggered by the grease meter when a delivered volume is stored.

2. The system of claim 1, wherein the memory and communication means of the grease meter are housed within an electronic module that can be repeatedly connected to and disconnected from mechanical parts of the grease meter.

3. The system of claim 1, wherein the grease meter further comprises means for measuring a sensor signal and for storing the measured signal.

4. The system of claim 3, wherein the sensor signal is a vibration signal or an ultrasound signal.

5. A system for executing a lubrication plan, the system comprising:
- a grease meter configured to measure a volumetric flow of grease through the meter; and
- a display device,
- wherein the grease meter is configured to:
  - store information including at least a series of prescribed grease volumes V1, V2, . . . Vn to be delivered at a corresponding series of lubrication points L1, L2, . . . Ln;
  - store a volume of grease delivered at each of the series of lubrication points; and
  - communicate with the display device; and
- wherein the display device is configured to:
- store an image of each of the lubrication points, each image being a photograph of a machine that includes the lubrication point and a visual indication of a location of the lubrication point of the machine,
- display an image of the lubrication point L1 and the prescribed grease volume V1 that is to be delivered at the lubrication point L1, and
- display an image of the lubrication point L2 in response to the volume of grease V1 delivered at the lubrication point L1 being stored by the grease meter.

6. The system according to claim 5,
- wherein the display device is configured to display an image of the lubrication point L3 in response to the volume of grease V2 delivered at the lubrication point L2 being stored by the grease meter.

7. The system of claim 5, wherein the grease meter further comprises means for measuring a sensor signal and for storing the measured signal.

8. The system of claim 7, wherein the sensor signal is a vibration signal or an ultrasound signal.

* * * * *